United States Patent
Niedzballa

(10) Patent No.: US 8,616,053 B2
(45) Date of Patent: Dec. 31, 2013

(54) METHOD AND DEVICE FOR MONITORING THE FILL LEVEL OF A LIQUID IN A LIQUID CONTAINER

(75) Inventor: Günter Niedzballa, Rüsselsheim (DE)

(73) Assignee: Areva GmbH, Erlangen (DE)

( * ) Notice: Subject to any disclaimer, the term of this patent is extended or adjusted under 35 U.S.C. 154(b) by 651 days.

(21) Appl. No.: 12/941,151

(22) Filed: Nov. 8, 2010

(65) Prior Publication Data

US 2011/0088465 A1 Apr. 21, 2011

Related U.S. Application Data

(63) Continuation of application No. PCT/EP2009/002032, filed on Mar. 19, 2009.

(30) Foreign Application Priority Data

May 6, 2008 (DE) .......................... 10 2008 022 363

(51) Int. Cl.
*G01F 23/00* (2006.01)

(52) U.S. Cl.
USPC .............. 73/295; 73/290 R; 73/291; 374/143; 374/E13.001

(58) Field of Classification Search
USPC .......... 73/290 R, 291, 295; 374/143, E13.001
See application file for complete search history.

(56) References Cited

U.S. PATENT DOCUMENTS

| | | | |
|---|---|---|---|
| 3,435,680 A | | 4/1969 | Holzer |
| 4,440,717 A | * | 4/1984 | Bevilacqua et al. .......... 376/247 |
| 4,449,403 A | | 5/1984 | McQueen |
| 4,592,230 A | * | 6/1986 | Waring et al. .................... 73/295 |
| 4,741,209 A | * | 5/1988 | McCulloch ...................... 73/295 |
| 4,785,665 A | | 11/1988 | McCulloch |
| 4,901,061 A | * | 2/1990 | Twerdochlib ................. 340/604 |
| 4,965,041 A | * | 10/1990 | Becker .......................... 376/258 |

(Continued)

FOREIGN PATENT DOCUMENTS

| DE | 102006025220 A1 | 12/2007 |
|---|---|---|
| GB | 2308192 A | 6/1997 |

(Continued)

*Primary Examiner* — Hezron E Williams
*Assistant Examiner* — Hoang Nguyen
(74) *Attorney, Agent, or Firm* — Laurence A. Greenberg; Werner H. Stemer; Ralph E. Locher

(57) ABSTRACT

A method for monitoring the fill level of a liquid in a liquid container, in particular for monitoring the coolant fill level in a reactor pressure vessel of a pressurized water reactor system, wherein a determination is made about the drop in the liquid level below the installed height of a heated thermal element by way of the temperature difference measured between said heated thermal element and an unheated thermal element associated therewith, both of said elements being disposed in the liquid container, said method comprising the especially reliable triggering of an alarm with a short response time while maintaining a low level of physical and controls engineering complexity when the liquid level to be monitored falls below a critical value. To this end, according to the invention the temporal progression of the temperature difference is continuously monitored for any significant increase, in particular sudden increase, within a time interval of pre-determined duration prior to the respective evaluation time, wherein an alarm signal is issued as soon as the change in the temperature difference within said time interval reaches or exceeds a pre-determined limit value.

19 Claims, 5 Drawing Sheets

(56) References Cited

U.S. PATENT DOCUMENTS

| | | | |
|---|---|---|---|
| 5,201,223 A * | 4/1993 | McQueen | 73/295 |
| 6,662,429 B1 * | 12/2003 | Domorazek | 29/593 |
| 7,287,426 B2 | 10/2007 | Frank | |
| 7,926,345 B2 * | 4/2011 | Kaercher et al. | 73/295 |
| 2009/0293608 A1 | 12/2009 | Kaercher et al. | |

FOREIGN PATENT DOCUMENTS

| | | |
|---|---|---|
| JP | 1035220 A | 2/1989 |
| RU | 2153712 C1 | 7/2000 |
| RU | 2161829 C1 | 1/2001 |
| UA | 21722 U | 3/2007 |
| WO | 2004081498 A2 | 9/2004 |

* cited by examiner

FIG. 3

Table I

| Time after dropping below heated thermocouple | Time, sec. | Heated thermocouple | Un-heated thermocouple | Delta T | Change in differential temperature delta T within the specified time interval | | | | | | | | | | | | | |
|---|---|---|---|---|---|---|---|---|---|---|---|---|---|---|---|---|---|---|
| | | | | | 1s | 2s | 3s | 4s | 5s | 6s | 7s | 8s | 9s | 10s | 20s | 30s | 40s | 50s |
| 1 | 2 | 3 | 4 | 5 | 6 | | | | | | | | | | | | | |
| | 91 | 120 | 115 | 5 | | | | | | | | | | | | | | |
| | 92 | 120 | 115 | 5 | 0 | | | | | | | | | | | | | |
| | 93 | 120 | 115 | 5 | 0 | 0 | | | | | | | | | | | | |
| | 94 | 120 | 115 | 5 | 0 | 0 | 0 | | | | | | | | | | | |
| | 95 | 120 | 115 | 5 | 0 | 0 | 0 | 0 | | | | | | | | | | |
| | 96 | 120 | 115 | 5 | 0 | 0 | 0 | 0 | 0 | | | | | | | | | |
| | 97 | 120 | 115 | 5 | 0 | 0 | 0 | 0 | 0 | 0 | | | | | | | | |
| | 98 | 120 | 115 | 5 | 0 | 0 | 0 | 0 | 0 | 0 | 0 | | | | | | | |
| | 99 | 121 | 116 | 5 | 0 | 0 | 0 | 0 | 0 | 0 | 2 | 0 | | | | | | |
| | 100 | 121 | 116 | 5 | 0 | 0 | 0 | 0 | 0 | 2 | 0 | 0 | 0 | | | | | |
| 1 sec. | 101 | 123 | 116 | 7 | 2 | 2 | 2 | 2 | 2 | 5 | 2 | 2 | 2 | | | | | |
| 2 sec. | 102 | 126 | 116 | 10 | 3 | 5 | 5 | 5 | 5 | 5 | 5 | 5 | 5 | 5 | | | | |
| 3 sec. | 103 | 131 | 116 | 15 | 5 | 8 | 10 | 10 | 10 | 10 | 10 | 10 | 10 | 10 | | | | |
| 4 sec. | 104 | 136 | 116 | 20 | 5 | 10 | 13 | 15 | 15 | 15 | 15 | 15 | 15 | 15 | | | | |
| 5 sec. | 105 | 143 | 116 | 27 | 7 | 12 | 17 | 20 | 22 | 22 | 22 | 22 | 22 | 22 | | | | |
| 6 sec. | 106 | 161 | 116 | 45 | 18 | 25 | 30 | 35 | 38 | 40 | 40 | 40 | 40 | 40 | | | | |
| 7 sec. | 107 | 173 | 116 | 57 | 12 | 30 | 37 | 42 | 47 | 50 | 52 | 52 | 52 | 52 | | | | |
| 8 sec. | 108 | 179 | 116 | 63 | 6 | 18 | 36 | 43 | 48 | 53 | 56 | 58 | 58 | 58 | | | | |
| 9 sec. | 109 | 183 | 116 | 67 | 4 | 10 | 22 | 40 | 47 | 52 | 57 | 60 | 62 | 62 | | | | |
| 10 sec. | 110 | 184 | 116 | 68 | 1 | 5 | 11 | 23 | 41 | 48 | 53 | 58 | 61 | 63 | | | | |
| 20 sec. | 120 | 195 | 116 | 79 | | | | | | | | | | 11 | 74 | | | |
| 30 sec. | 130 | 201 | 116 | 85 | | | | | | | | | | 6 | 17 | 80 | | |
| 40 sec. | 140 | 204 | 116 | 88 | | | | | | | | | | 3 | 9 | 20 | 83 | |
| 50 sec. | 150 | 206 | 116 | 90 | | | | | | | | | | 2 | 5 | 11 | 22 | 85 |

FIG. 5

Table II

| Time after dropping below heated thermocouple | Time, sec. | Heated thermo-couple | Un-heated thermo couple | Delta T | Change in differential temperature delta T within the specified time interval | | | | | | | | | | | | | |
|---|---|---|---|---|---|---|---|---|---|---|---|---|---|---|---|---|---|---|
| | | | | | 1s | 2s | 3s | 4s | 5s | 6s | 7s | 8s | 9s | 10s | 20s | 30s | 40s | 50s |
| 1 | 2 | 3 | 4 | 5 | 6 | | | | | | | | | | | | | |
| | 91 | 335 | 330 | 5 | | | | | | | | | | | | | | |
| | 92 | 335 | 330 | 5 | 0 | | | | | | | | | | | | | |
| | 93 | 335 | 330 | 5 | 0 | 0 | | | | | | | | | | | | |
| | 94 | 335 | 330 | 5 | 0 | 0 | 0 | | | | | | | | | | | |
| | 95 | 335 | 330 | 5 | 0 | 0 | 0 | 0 | | | | | | | | | | |
| | 96 | 335 | 330 | 5 | 0 | 0 | 0 | 0 | 0 | | | | | | | | | |
| | 97 | 335 | 330 | 5 | 0 | 0 | 0 | 0 | 0 | 0 | | | | | | | | |
| | 98 | 335 | 330 | 5 | 0 | 0 | 0 | 0 | 0 | 0 | 0 | | | | | | | |
| | 99 | 336 | 331 | 5 | 0 | 0 | 0 | 0 | 0 | 0 | 0 | 0 | | | | | | |
| | 100 | 336 | 331 | 5 | 0 | 0 | 0 | 0 | 0 | 0 | 0.5 | 0 | 0 | | | | | |
| 1 sec. | 101 | 336.5 | 331 | 5.5 | 0.5 | 0.5 | 0.5 | 0.5 | 0.5 | 0.5 | 1 | 0.5 | 0.5 | 0.5 | | | | |
| 2 sec. | 102 | 337 | 331 | 6 | 0.5 | 1 | 1 | 1 | 1 | 1 | 1 | 1 | 1 | 1 | | | | |
| 3 sec. | 103 | 338.5 | 331 | 7.5 | 1.5 | 2 | 2.5 | 2.5 | 2.5 | 2.5 | 2.5 | 2.5 | 2.5 | 2.5 | | | | |
| 4 sec. | 104 | 341 | 331 | 10 | 2.5 | 4 | 4.5 | 5 | 5 | 5 | 5 | 5 | 5 | 5 | | | | |
| 5 sec. | 105 | 343 | 331 | 12 | 2 | 4.5 | 6 | 6.5 | 7 | 7 | 7 | 7 | 7 | 7 | | | | |
| 6 sec. | 106 | 346 | 331 | 15 | 3 | 5 | 7.5 | 9 | 9.5 | 10 | 10 | 10 | 10 | 10 | | | | |
| 7 sec. | 107 | 347 | 331 | 16 | 1 | 4 | 6 | 8.5 | 10 | 10.5 | 11 | 11 | 11 | 11 | | | | |
| 8 sec. | 108 | 348 | 331 | 17 | 1 | 2 | 5 | 7 | 9.5 | 11 | 11.5 | 12 | 12 | 12 | | | | |
| 9 sec. | 109 | 349 | 331 | 18 | 1 | 2 | 3 | 6 | 8 | 10.5 | 12 | 12.5 | 13 | 13 | | | | |
| 10 sec. | 110 | 350 | 331 | 19 | 1 | 2 | 3 | 4 | 7 | 9 | 11.5 | 13 | 13.5 | 14 | | | | |
| 20 sec. | 120 | 354 | 331 | 23 | | | | | | | | | | 4 | 18 | | | |
| 30 sec. | 130 | 359 | 331 | 28 | | | | | | | | | | 5 | 9 | 23 | | |
| 40 sec. | 140 | 360 | 331 | 29 | | | | | | | | | | 1 | 6 | 10 | 24 | |
| 50 sec. | 150 | 361 | 331 | 30 | | | | | | | | | | 1 | 2 | 7 | 11 | 25 |

METHOD AND DEVICE FOR MONITORING THE FILL LEVEL OF A LIQUID IN A LIQUID CONTAINER

CROSS-REFERENCE TO RELATED APPLICATION

This application is a continuation, under 35 U.S.C. §120, of copending international application No. PCT/EP2009/002032, filed Mar. 19, 2009, which designated the United States; this application also claims the priority, under 35 U.S.C. §119, of German patent application No. DE 10 2008 022 363.8, filed May 6, 2008; the prior applications are herewith incorporated by reference in their entirety.

BACKGROUND OF THE INVENTION

Field of the Invention

The invention relates to a method for monitoring the fill level of a liquid in a liquid container, in particular for monitoring the coolant fill level in a reactor pressure vessel in a pressurized-water reactor plant, in which the sinking of the liquid level below the installation level of a heated thermocouple is inferred using the measured temperature difference between the heated thermocouple and an associated unheated thermocouple, which are both arranged in the liquid container. The invention further relates to an electronic evaluation and control unit for carrying out the method and to a device for monitoring fill levels with such an evaluation and control unit.

Measuring devices or fill level probes in which the fill level height in a liquid container is inferred using the thermovoltage produced by a heated thermocouple are used in particular in nuclear power plants since they are relatively insensitive to radioactive radiation compared to measuring devices based on other measurement principles and can therefore also function reliably in the case of an incident with radiation values which may be increased. Such measuring devices are used for example in the reactor pressure vessel of a pressurized-water reactor for monitoring therein—in particular during start-up and shut-down operations and during transient operating states—the level height of the cooling liquid flowing through the primary circuit of the power plant installation above the fuel assemblies.

The measurement principle makes use of the different heat transfer characteristics which occur when heat is transferred from a heating element to a liquid coolant surrounding the heating element, on the one hand, and to a gaseous or vaporous medium, on the other hand. As long as the liquid cooling medium surrounds the heating element, the heat generated by the latter is dissipated quickly, with the result that even in its immediate vicinity the temperature is only negligibly above that surrounding temperature which would occur in the unheated case. If now, by way of example, the situation arises during regular reactor operation or also in the case of a reactor incident that, due to the manner of operation or to a pressure drop in the primary circuit, the liquid level in the reactor pressure vessel sinks below the height of the heating element, the latter is therefore surrounded by vaporous coolant, and the heat transfer characteristics thus deteriorate. As a result, the temperature surrounding the heating element rises, which can be detected by a thermometer mounted adjacent to the heating element or a temperature sensor.

Suitable temperature sensors used due to their reliable and robust operating method are typically thermocouples which provide a thermovoltage which is largely proportional to the temperature.

Usually a plurality of heated thermocouples are arranged at specific spacings from one another on a rod- or tube-shaped support or on/in an elongate measurement tube which is immersed in the liquid to be monitored with regard to its level height and inside which the supply and signal lines necessary for the supply of power to the heating elements and for the transmission of signals to an external evaluation unit are also guided. The sensors arranged at various heights or measurement positions thus permit a digital, physically discrete indication of the fill level height in the vessel, with the (spatial) resolution being a function of the number of thermosensors per height section.

A measuring device of this type is known for example from the commonly assigned patent application publication No. US 2009/0293608 A1 and its German published counterpart DE 10 2006 025 220 A1. In addition to the heated thermocouples acting as primary signal transmitters, unheated thermocouples which supply a reference signal assigned to the respective primary signal are also arranged inside the measurement tube. In this manner, it is also possible to take into account a temporal variation of the liquid temperature or surrounding temperature when evaluating the temperature information and determining the fill level height therefrom. Without such a measure, for example, a rise or fall in the liquid temperature could erroneously be interpreted as a variation in the filling height or an actual change in the filling height could be "covered up" by a simultaneous change in the liquid temperature.

Typically, the temperature difference between a heated thermocouple and an unheated (reference) thermocouple assigned thereto is ascertained when evaluating the measurement signals. An alarm is triggered when the temperature difference reaches a specific pre-specified value, which can no longer be mistaken for a normal temperature fluctuation of the reactor medium but signals reliably that the liquid level has sunk below the installation level of the heated thermocouple in the liquid container. In order to trigger an alarm, either information relating to the temperature of the heated and of the associated unheated thermocouple (reference temperature) is needed and the temperature difference is then formed in the electronic evaluation system, or the heated and unheated thermocouples are connected to one another such that the resulting signal directly reflects the temperature difference between the two.

In the nuclear-engineering context, this means that: due to such a use of the reference temperature measurement, changes in the coolant temperature in the reactor during start-up and shut-down or sudden temperature changes as a result of exceptional output increases or so-called cold strands have no or at least hardly any effect on the temperature difference, since the heated and the associated unheated thermocouple are equally affected thereby.

However, this is only strictly true for an idealized viewpoint. In practice, on the other hand, effects of secondary order must be taken into account:

This includes predominantly the fact that without active heating current regulation the temperature difference between heated and unheated thermocouples decreases with rising ambient temperature, i.e. with rising temperature of the reactor coolant. One of the reasons for this is that with rising media temperature in the liquid container, the heating wire with the heating elements or heating zones (heating wire sections with increased resistance) provided for heating the thermocouples is also heated more strongly (from the outside). As a result, the resistance in the heating wire increases and, with the voltage remaining the same, a lower current flows through it. As a result thereof, the thermal output of the heating element also decreases, since said output is proportional to the square of the current which flows through it ($P=R*I^2$).

That means: since, on the one hand, with unregulated heating current the temperature difference between heated and unheated thermocouples, which are surrounded by liquid, decreases with rising temperature of the liquid, but, on the other hand, a single constant threshold value of the temperature difference for triggering an alarm is usually fixed for reasons of simplicity in terms of regulation technology, the temperature rise of the heated thermocouple, which is necessary for triggering an alarm and is effected, when the liquid level sinks and during the change into the vapor phase, by way of the change in the heat transfer characteristic, increases with rising temperature.

If the necessary rise in temperature up to when the threshold value is reached is too great, this can lead to an inadmissibly long reaction time which no longer corresponds to the safety-technological specifications. In addition, a lower heat output with simultaneously increased ambient temperature also leads to a less sudden signal change if the liquid level sinks below the height of the heated thermocouple. This means that in the worst case the alarm will no longer be triggered at all.

In order to compensate for the described effects, a method and a correspondingly adapted measuring device have been developed, in which the heating current of the heating wire is regulated such that, even if the operating temperatures rise, it will not decrease or will possibly even increase slightly in order to shorten in the high temperature range the reaction time of the system, that is to say the reaction time in the case of an alarm. Due to heating current regulation of this kind, in practice the temperature difference ("delta T") between the heated and the associated unheated thermocouple in the liquid is approximately constant, i.e. independent of the operating temperature.

In other words: the heating current regulation leads to an approximately horizontal characteristic line in a graph, in which the temperature difference between the heated and the unheated thermocouple—in liquid—is plotted over the media temperature ("delta T over T"). This makes it possible to determine a single limit value for the temperature difference between the heated and the unheated thermocouple, if it is exceeded, an alarm being triggered which reliably signals that the fill level has dropped below the heated thermocouple, which applies to the entire admissible temperature range of the liquid to be monitored (reactor cooling medium), and which enables acceptable reaction times.

In addition to these obvious advantages, the method of heating current regulation also has disadvantages, however:

one essential disadvantage is that the heating current regulation could malfunction under unfavorable conditions. In the case of an assumed malfunction of the heating current regulation, the characteristic line of the temperature difference between the heated and the unheated thermocouple, plotted over the operating temperature, would again change unfavorably.

In the case where this applies to nuclear engineering, this means: if after such a regulation malfunction during the operation the heating current is manually increased in order to shorten the reaction time or to ensure that the alarm is triggered, this leads to triggering of an alarm during shut-down of the reactor even though the coolant level has actually not sunk at all (false alarm). Depending on any realized locking mechanisms, a false triggering of an alarm could thus lead to automatic start-up of the high pressure injection pumps, and thus ultimately to an undesired increase in pressure in the primary circuit with subsequent response by the safety valves. On account of this behavior, the measurement system cannot be operated at all operating temperatures with the heating output matched to the highest operating temperature, which is exactly what would be desirable in view of the desired height of the sudden signal change in the response case.

In addition, the following further problems also apply: when a colder medium flows around parts of the heating wire, this leads to a reduction in the heating current and thus, in addition to a decrease in the temperature difference between the heated and the unheated thermocouple, also to a less sudden signal change. The reason for this is that the currently used regulation detects the change in the medium temperature only indirectly via the change in the heating wire resistance.

This indirect closed-loop control (regulation) also results in the need for the heating wire to be made of a material, the resistivity of which changes significantly in dependence on the temperature, since this is a prerequisite of stable closed-loop control. This fact influences the probe design strongly since it must be ensured that the heating wire used has the required properties. This can cause a significant outlay in terms of coordination with respect to the interface between the actual measurement probe and the electronic evaluation system.

SUMMARY OF THE INVENTION

It is accordingly an object of the invention to provide a method and device for monitoring the fill lebel of a liquid in a liquid container which overcome the above-mentioned disadvantages of the heretofore-known devices and methods of this general type and which method and device enable particularly reliable alarm triggering with short reaction times as soon as the liquid level to be monitored falls below a critical value, while keeping the outlay in terms of apparatus and control technology low.

With the foregoing and other objects in view there is provided, in accordance with the invention, a method of monitoring a fill level of a liquid in a liquid container, which comprises:

providing a liquid container with a heated thermocouple mounted in the container at a given installation height level and an associated unheated thermocouple;

inferring that the liquid level has sunk below the given installation height level of the heated thermocouple from a measured temperature difference between the heated thermocouple and the unheated thermocouple;

continuously monitoring a temporal profile of the temperature difference for a significant increase (e.g., a sudden increase) within a time interval, which occurs before a respective evaluation time point, of a duration that is previously fixed;

outputting an alarm signal as soon as a change in the temperature difference within the time interval reaches or exceeds a previously fixed limit value;

thereby ascertaining a sequence of temperature differences over a large number of periodically sequential measurement time points, wherein the differences between the last ascertained sequence element and all of its predecessors, the measurement time points of which fall within a time interval of pre-specified length, are formed at an evaluation time point, and the alarm signal is output as soon as at least one of the differences reaches or exceeds a previously fixed limit value.

With respect to the method, the object is achieved according to the invention by way of the fact that the temporal profile of the temperature difference is continuously monitored for a significant, in particular sudden, increase within a time interval, which occurs before the respective evaluation time point, of a duration which is previously fixed, where an alarm signal is output as soon as the change in the temperature difference within the time interval reaches or exceeds a previously fixed limit value.

The invention proceeds from the assumption that the evaluation of the measured temperature difference between the heated and the unheated thermocouple should be entirely designed for earliest possible detection of comparatively steep or sudden rising edges in the difference signal in order to be in a position to detect a sinking liquid level at a very early stage. In a departure from the hitherto realized measurement principle, in which alarm triggering is plain and simply connected to the fact that the measured temperature difference will at some point in the monitoring interval exceed a (global) limit value which has been set once, the temporal change in the temperature difference within a time interval of a previously fixed duration is now defined as the triggering criterion. If the value of the temperature difference is plotted over time in the manner of a function graph, the time interval or "time window" relevant for the evaluation here moves, as it were, together with the profile of the function which progresses in the direction of the time axis, i.e. it is constantly updated.

The length of the time interval is expediently chosen such that, in terms of order of magnitude, it substantially corresponds to, or is slightly shorter than, the time scale of the processes to be monitored, i.e. of the level changes and the temperature dynamics at the thermocouples caused thereby. Moreover, the measurement principle is expediently configured for real-time monitoring: the end time point of the time interval relevant for the evaluation therefore substantially coincides with the evaluation time point, which in turn substantially corresponds to that time point for which the last measurement value of the temperature difference between the heated and the unheated thermocouple is available.

In a particularly advantageous embodiment, a sequence of differential temperatures is ascertained over a large number of periodically sequential measurement time points, wherein the differences between the last ascertained sequence element and all of its predecessors, the measurement time points of which fall within a time interval of pre-specified length, are formed at an evaluation time point, and wherein an alarm signal is output as soon as at least one of the differences reaches or exceeds a previously fixed limit value. In this case, the evaluation process is expediently repeated in the manner of an iterative procedure at each measurement time point.

Such a variant of the method with discrete time steps is particularly well suited for implementation in a digital electronic evaluation system, in particular in digital safety control technology in a nuclear engineering plant. The time interval between the individual measurement time points is in this case advantageously chosen to be considerably shorter than the duration of the time interval relevant for the evaluation. Owing to said type of difference formation between the sequence elements in the measurement series, sudden changes in the temperature difference between the heated and the unheated thermocouple are ascertained particularly consistently. In the extreme case, a corresponding sudden signal change between two successive time steps (evaluation time point and directly preceding measurement time point) would already cause an immediate triggering of an alarm. On the other hand, even an increase in the temperature difference which is not that abrupt leads to an alarm being triggered if only the set limit value for the change is exceeded within the pre-specified evaluation interval.

It is particularly advantageous in an application in the nuclear engineering field if the temporal gap between two immediately successive measurement time points is pre-specified to be in the range between 50 ms and 1000 ms, in particular in the range between 100 ms and 350 ms. The length of the time interval relevant for the respective evaluation process is advantageously pre-specified to be in the range between 30 s and 100 s and is, in particular, approximately 50 s. This approximately corresponds to the time interval within which the thermal balance processes at the thermocouples and their cladding are typically concluded after the coolant fill level in the reactor pressure vessel has sunk below the heated thermocouple.

For example, if the temporal gap between successive measurement time points is 250 ms and the time interval relevant for the evaluation is set to be 50 s, 200 measurement signals for the differential temperature between the heated and the unheated thermocouple must be temporarily stored in the electronic evaluation system for a single evaluation process. Advantageously, this temporary storage takes place in a memory module operating on the first-in-first-out (FIFO) principle. Like in a shift register, the memory content is here shifted by one memory location with each time step and the now free memory position is occupied by the measurement value ascertained last.

If the temperature difference between the heated and the unheated thermocouple is only formed in the evaluation apparatus, and a corresponding difference signal is not already provided by a corresponding interconnection of the thermocouples, temporary storage of the individual temperature signals of the two mutually assigned thermocouples can advantageously also be provided. The difference with respect to the two thermocouples is then formed in the evaluation unit, wherein the individual differential temperatures between the heated and the unheated thermocouple are then likewise advantageously temporarily stored in order to obviate the need to calculate them anew each time when the differences between temporally successive sequence elements are formed (although the latter would in principle also be possible).

In one advantageous development, alarm staggering is provided, in which for the respective evaluation process a plurality of different limit values are pre-specified, where respectively different alerts, possibly with different sequence reactions, are triggered when said limit values are reached or exceeded. By way of example, advance warnings can be triggered in the case of specific, comparatively minor sudden changes in the differential temperature, which are previously fixed, and the attention of the operator can thus be steered to any existing problems. In other words, provision may initially be made for a preliminary state of alert to be introduced, with states of alert of varying severity or priority following.

It is furthermore advantageous if an alarm or state of alert, once triggered, is canceled when the fill level in the vessel to be monitored rises again after an initial drop.

In a first variant, which can be applied equally in thermocouples with or without heating current regulation, the alarm is deactivated if, after the alarm has been triggered, it is determined that the temperature difference between the heated and the unheated thermocouple has dropped by a pre-specified amount within a pre-specified time interval. That means that here, too, the change in the measurement value within a specific time interval is once again crucial.

In a second variant, which, however, only makes sense in the case of heating current regulation, an alarm, once triggered, is deactivated if, after the alarm has been triggered, it is determined that the temperature difference has dropped to, or below, a threshold value which is pre-specified in a temperature-independent fashion.

Alternatively, in a third variant, the temperature and/or the pressure of the medium, which is to be monitored with respect to its fill level height, in the liquid container is measured and an alarm, once it has been triggered, is deactivated if, after the alarm has been triggered, it is determined that the temperature difference between the heated and the unheated thermocouple has dropped to, or below, a threshold value which is pre-specified in dependence on the instantaneous temperature and/or the instantaneous pressure.

With respect to the device, the object set out in the introduction is achieved by way of an electronic evaluation and control unit for use in a device for monitoring the fill level of a liquid in a liquid container, comprising:

in each case one signal input for the measurement signals of an associated heated and an unheated thermocouple, and a subtraction unit, which forms a temperature difference signal, which is characteristic for the temperature difference with respect to the two thermocouples, from the measurement signals, or, alternatively, a signal input for a temperature difference signal of a circuit with a heated and an unheated thermocouple, an evaluation unit with means for continuous monitoring of the temporal profile of the temperature difference for a significant, in particular sudden, increase within a time interval of previously fixed duration, which time interval occurs before the respective evaluation time point, and means for outputting an alarm signal as soon as the increase in the temperature difference within the time interval reaches or exceeds a previously fixed limit value.

The electronic evaluation and control unit is in this case expediently a component of a device for monitoring the liquid fill level in a liquid container, in particular for monitoring the coolant fill level in a reactor pressure vessel in a pressurized-water reactor, which device comprises at least one heated and one associated unheated thermocouple which are connected to the evaluation and control unit.

The concept according to the invention has, as compared with concepts that are known or have been used to date, a host of advantages:

A. No More Need of a Horizontal Differential Temperature Characteristic Line

As described in the introduction, it has so far been necessary to achieve in the liquid phase an approximately equal temperature difference between heated and associated unheated thermocouples which is independent of the operating temperature. With the novel evaluation method, there is no more need for a horizontal characteristic line of the differential temperature, which is parallel to the time axis, since only differential temperature changes within a specific time interval, for example within the last 50 s, are evaluated.

B. Malfunction of the Heating Current Regulation Does Not Pose a Problem

In the case where heating current regulation is present, the only requirement in terms of the heating current is now that it must be measured such that even at maximum operating temperature a sufficiently great signal change (differential temperature change) within a sufficiently short period of time is ensured if the liquid level sinks below the heated thermocouple. If the heating current regulation is designed such that the heating current assumes, if the regulation malfunctions, its value which is provided for maximum operating temperatures (maximum admissible voltage), the function of the fill level measurement is also no longer impaired if the heating current regulation malfunctions.

C. Possibility to Dispense with Active Heating Current Regulation

The novel manner of signal evaluation also enables, in principle, the operation of the heating wire for the heated thermocouple at all times with the voltage provided for maximum operating temperatures. It is possible to completely dispense with active regulation, without this resulting in false alarms during start-up and shut-down. A constant voltage applied at the heating wire results in higher current when the reactor cools due to the decreasing heating wire resistance. As a result, the differential temperature between the heated and the unheated thermocouple increases with decreasing coolant temperature in the reactor, which could hitherto trigger false alarms. Due to the novel method of signal evaluation, however, this is no longer a problem since this temperature rise in the reactor medium is not of a sudden character. In addition, due to the increasing heating current, the reaction times are shorter and the signal changes greater.

If the active regulation malfunctions, the material of the heating wire between the heating elements can also be optimized such that it has as low a resistance as possible and the current consumption of the measurement system is lowered. In this case, there is no longer any need to heed the hitherto required temperature-dependent minimum change in the heating wire resistance, which has hitherto been necessary for achieving stable regulation. Quite the contrary, the resistance change of the entire heating wire as a function of the temperature should now be as low as possible so that the currents do not become too high at low temperatures.

If a plurality of thermocouples are heated with the same heating wire, the novel signal evaluation makes it possible to calibrate only the thermocouple with the worst reaction at maximum operating temperature. The other thermocouples do not need to be calibrated especially, since a horizontal differential temperature characteristic line is no longer necessary.

This is especially advantageous for the design of such measurement probes, in which a plurality of thermocouples are heated by a single heating wire and in which it is particularly difficult to simultaneously achieve a horizontal characteristic line for all the measured differential temperatures.

D. If Required, Simplified Heating Current Regulation is Possible

If regulation of the heating current as a function of the operating temperature is not to be completely dispensed with (for example in order to save even more energy), the problems in the current heating current regulation in terms of cold strands can be avoided by fixing the heating current directly as a function of the average media temperature. This is now possible without disadvantageous consequences owing to the reduced requirements in terms of the differential temperature characteristic line and thus of the magnitude of the heating current.

E. Shorter Reaction Times

Despite heating current regulation, and especially if it malfunctions, different increases in the differential temperature between heated and unheated thermocouples at different operating temperatures have hitherto been necessary to trigger an alarm. Since in the novel method of signal evaluation an alarm is always triggered when the differential temperature within a specific time interval has increased by a specific, fixedly pre-specified amount, the reaction times for all operating temperatures shorten to the shortest reaction times which can be achieved with the previous evaluation method.

F. Flexible Individual Limit Values and Optimized Reaction Times

In conjunction with a digital system architecture, if required, it is possible, for each pair of thermocouples, to simply and quickly define or parameterize individual limit values (sudden differential temperature changes), which take into account production-related features. The use of a freely programmable automation system, which also interacts or exchanges information with the other control technology apparatuses, enables the additional optimization of the limit values as a function of the operating temperature and of the primary circuit pressure.

G. Staggered Alerts

The possibility of staggered alerts and the advantages thereof were already discussed further above.

H. Adaptation and Comments of Alerts

Due to the use of the information present in the digital reactor protection system, it is possible for the signals of the fill level probes to be evaluated also as a function of deviations of the reactor plant from normal operation (for example malfunction of coolant pumps, pressure changes in the primary circuit etc.). If the reactor protection system determines such deviations and it is known from previous attempts or calculations or based on operational experience that these deviations can influence the fill level measurement, a suitably configured automatic expert system can adapt, by way of corresponding combinations, the limit values for the fill level measurement or comment on the output signals. The comments can appear, if such exceptional operational events occur, automatically on a screen of the monitoring system next to the warning or alarm signals and thus prevent misinterpretations by human users.

The abovementioned advantages are firstly independent of the concrete design of the measurement probe carrying the heated and unheated thermocouples and can be realized alone by corresponding configuration or programming of the electronic evaluation and control unit.

Moreover, further advantages ensue if the probe design is adapted to the now prevailing conditions and possibilities in the evaluation of signals:

as was already expressed above, the novel signal evaluation reduces the requirements in terms of the heating current regulation or possibly renders it completely unnecessary. As a result, the hitherto complex calibration of the heating current characteristic line, which is especially difficult if the very same heating wire is used to heat a plurality of thermocouples in a probe, can be dispensed with. That means that from now on, a plurality of thermocouples can be heated with the aid of the same heating wire, without impacting on the quality of the measurement. As a result, with redundancy requirements remaining the same, the cabling complexity inside a probe decreases or, with the cabling complexity remaining the same, more measurement positions than previously can be realized, in particular for finer height resolution of the fill level measurement. Such an improved height resolution permits better observation of the temporal fill level development and, if appropriate, better prediction relating to future developments, for example by extrapolating available data. In addition, in the case of a combination of the information relating to the rate of the liquid drop (or to changes in the drop rate), it is possible with simple physical models of fill level dynamics and, if appropriate, with further measurement data of the reactor protection system to derive statements concerning the size of leakages or the effectiveness of countermeasures.

In summary, with the same design of the measurement lances as before, the novel evaluation method permits especially:

the heating current regulation to be dispensed with or a simplified configuration
shorter reaction times
optimization of the reaction times as a function of temperature or pressure
staggered alerts
assessment and comments relating to the probe signals in the case of transients
lower probability of false alarms
reduction in energy consumption.

A correspondingly modified lance design, together with the novel signal evaluation, permits:

more measurement points per unit height
predictions relating to fill level developments
statements regarding the size of leakages.

In addition, coupling of the electronic evaluation system to fill level measurement lances of various manufacturers is simplified by the proposed changes and fewer interface problems occur.

Other features which are considered as characteristic for the invention are set forth in the appended claims.

Although the invention is illustrated and described herein as embodied in a method and device for monitoring the fill level of a liquid in a liquid container, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 3 shows a table which is associated with the temporal profile of the temperature difference according to FIG. 2, the entries in which illustrating a preferred evaluation method for the fill level monitoring and alarm triggering, FIG. 5 shows an evaluation table which is associated with the profile of the temperature difference according to FIG. 4.

DETAILED DESCRIPTION OF THE INVENTION

Figure 1:
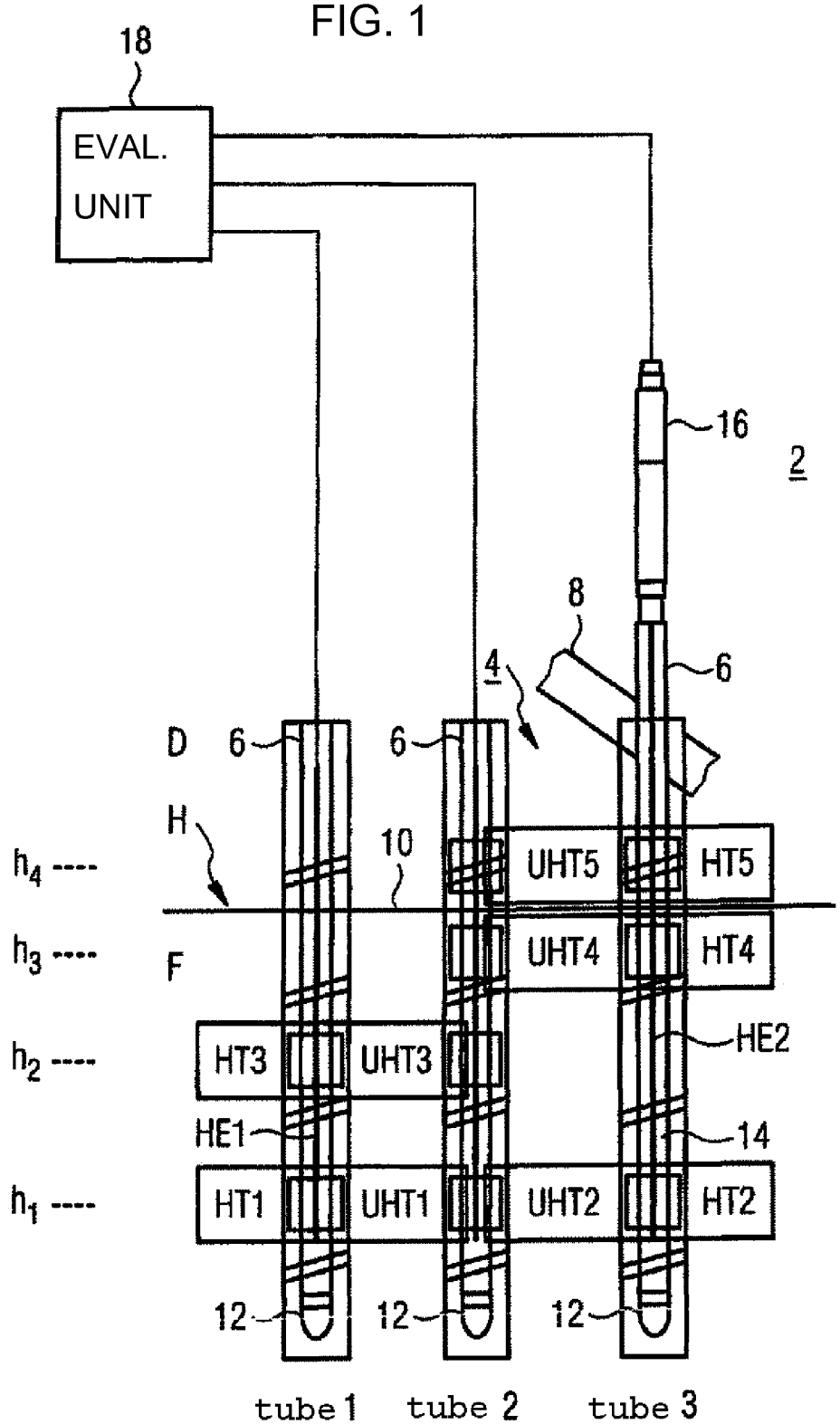
FIG. 1 shows a greatly schematized side view of a device for monitoring the fill level of a liquid in a reactor pressure vessel with a plurality of pairs of mutually assigned heated and unheated thermocouples.

Referring now to the figures of the drawing in detail and first, particularly, to schematic side view illustration of FIG. 1 thereof, there is shown a device 2 for fill level measurement which serves for monitoring the level of the cooling liquid F in the reactor pressure vessel 4 in a pressurized-water reactor (not illustrated in greater detail here). The device 2 comprises three elongate measurement tubes 6, configured in the manner of a measurement lance, which measurement tubes 6 are inserted during the installation of the measuring device 2 through cutouts in the cover plate 8, which are provided for this purpose, from the top into the inside of the reactor pressure vessel 4 and which during operation of the nuclear reactor are immersed at least partially in the cooling liquid F. The level height or fill level height above the bottom of the vessel is designated H in FIG. 1, wherein other reference levels can, of course, also be used. Vaporous cooling medium, in short: vapor D, is located above the liquid level 10.

The three measurement tubes 6 of the device 2 are in each case vertically aligned and installed in the reactor pressure vessel 4 with mutual spacings; that means they are mutually parallel without touching. Each of the three measurement tubes 6 has a cylindrical housing 12, which is closed in a water-tight manner at the lower end and is composed of a water-impermeable, pressure-resistant, corrosion-resistant material with good thermal conductivity: in the exemplary embodiment, stainless steel is used for this purpose.

A number of thermocouples are arranged in the interior 14 of each measurement tube 6. The measurement tube that is designated "tube 1" contains two heated thermocouples, that is to say the heated thermocouple HT1 located at a height $h_1$ and the heated thermocouple HT3, which is arranged above it at a height $h_2$. The measurement tube that is designated "tube 3" contains, in its interior 14, three heated thermocouples, that is to say the heated thermocouple HT2 located at height $h_1$, the heated thermocouple HT4, which is arranged above it at height $h_3$, and finally the heated thermocouple HT5 at height $h_4$. In this case, $h_4 > h_3 > h_2 > h_1$. Furthermore, heating elements are arranged in the interior 14 of tube 1 and tube 3, specifically HE1 in tube 1 and HE2 in tube 3. The heating elements are configured in each case as heating wires which pass the thermocouples HT1 and HT3, or HT2, HT4 and HT5 to be heated, with the heating wires having heating zones positioned near these thermocouples, which heating zones are used to heat the immediate vicinity.

The heating elements HE1 and HE2 and also the thermocouples HT1 and HT3, and HT2, HT4 and HT5, bear directly against the internal wall of the respectively associated housing 12, which has good thermal conductivity. The heating wires and the signal and supply lines necessary for energy supply and signal transfer of the thermocouples are guided in the interior 14 of the respective measurement tube 6 up to a connection adapter 16 located outside the cover plate 8 of the reactor pressure vessel 4. The thermocouples HT1 to HT5 are connected, via the two connection adapters 16 (of which only the connection adapter associated with tube 3 is illustrated in FIG. 1) which are associated with tube 1 and tube 3, on the signal side to an electronic evaluation and control unit 18 (here only indicated schematically), which for its part is connected (not illustrated) to other components of a reactor protection system, in particular to an alarm signal transmitter. The alarm signal transmitter may also be integrated in the evaluation and control unit 18.

The measurement tube 6, designated "tube 2", contains, in its interior 14, five unheated thermocouples, two of which are arranged at height $h_1$ (UHT1 and UHT2), and the others in each case at heights $h_2$, $h_3$ and $h_4$ (specifically UHT3, UHT4 and UHT5). The unheated thermocouples UHT1 to UHT5 also have in each case direct contact with the internal wall of the housing 12, which has good thermal conductivity, and are connected, via a connection adapter (not illustrated further here), on the signal side to the evaluation unit 18, which is located externally. However, no heating apparatus or the like is provided in tube 2.

For reasons of signal evaluation and fill level ascertainment, in each case one heated thermocouple (primary signal transmitter) and an unheated thermocouple (reference signal transmitter), which is located at the same height—inside another measurement tube—, are combined. The five pairs HT1, UHT1 to HT5, UHT5 are thus formed during the signal processing in the evaluation unit 18, which is shown in FIG. 1 schematically by the solid lines framing the mutually complementary thermocouples. The temperature prevailing at the position of the thermocouple is derived from the measured thermovoltage of each thermocouple. Furthermore, the temperature difference between the heated and the unheated thermocouple is formed for each of the pairs HT1, UHT1 to HT5, UHT5.

Figure 2:
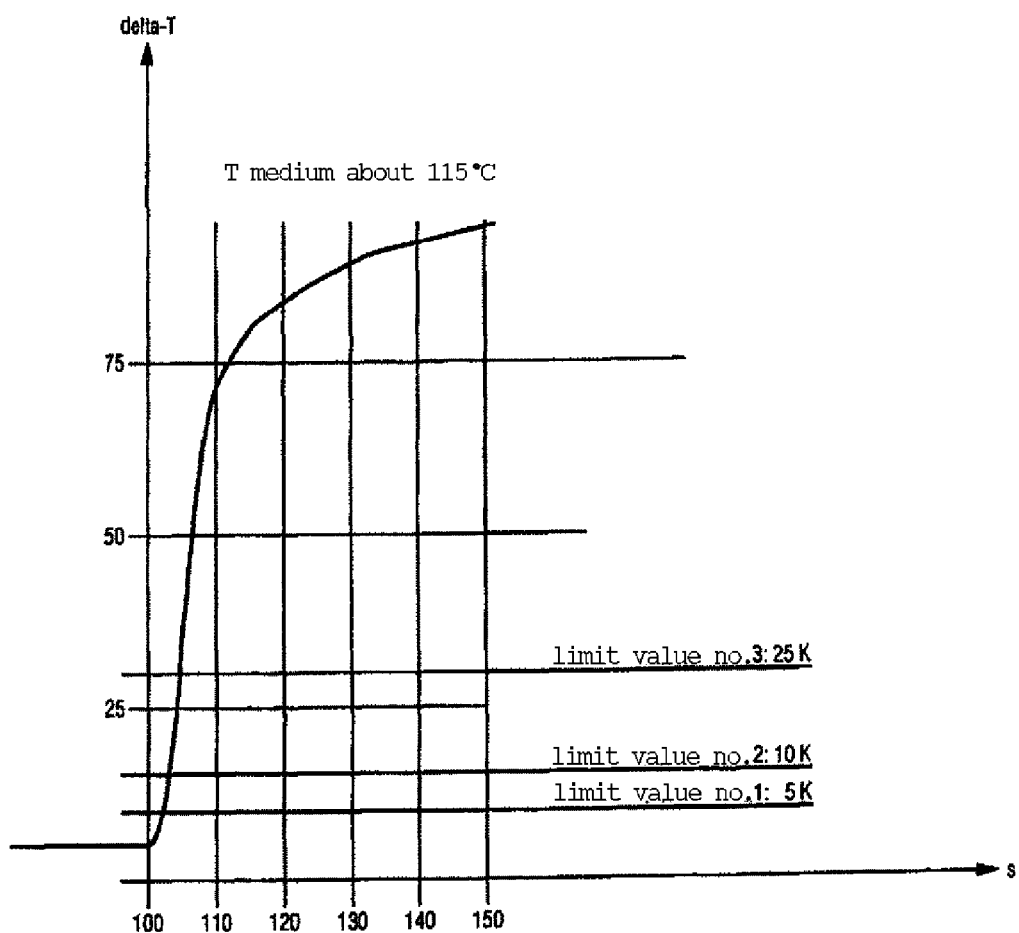
FIG. 2 shows an example of the temporal profile of the temperature difference between a heated and an unheated thermocouple during a dropping process of the liquid level at an operating temperature of about 115° C.

The mode of action of the heated and unheated thermocouples and their use for measuring the fill level are described by way of example with reference to the signal transmitter pair HT5, UHT5. FIG. 2 involves reactor operation with fill level height H in the reactor pressure vessel 4 and with an intact cooling circuit at a coolant temperature of about 115° C. (for example during start-up operation, where the coolant temperature increases by about 10-30° C. per hour). As long as the level of the cooling liquid F is above the installation height level of the heated thermocouple HT5 (H>$h_4$), the heat given off by the heating element HE2 in the vicinity of the thermocouple HT5 is dissipated comparatively effectively through the housing wall of the housing 12 and transferred to the cooling liquid F. Since new, i.e. comparatively cold, cooling liquid F continuously flows into the reactor pressure vessel (open system in terms of thermodynamics), the wall temperature in the vicinity of the thermocouple HT5 hardly rises relative to the unheated case, represented by the unheated thermocouple UHT5.

That means that the temperature difference delta T, or DT for short, between the heated thermocouple HT5 and the unheated thermocouple UHT5, as plotted in FIG. 2 as a function of time t, is approximately zero (specifically 5° C., in this case). This would not even change noticeably if the temperature of the cooling liquid F changed (globally), for example if it rose, with the fill level height H of the cooling liquid F in the reactor pressure vessel 4 remaining the same, since the two relevant thermocouples HT5, UHT5 would be influenced equally thereby. Any effects of thermal stratification in the reactor pressure vessel, that is to say temperature gradients in the vertical direction, play no role either because the two mutually assigned measurement positions are at the same height, in this case that is $h_4$.

The picture changes if at time point t=100 s—here randomly chosen—the fill level height H of the cooling liquid F falls under the level $h_4$ (H<$h_4$). The ambient temperatures in the two relevant thermocouples HT5 and UHT5 do not initially change to any great extent since the vapor D, located above the liquid level 10, has similar temperatures as the cooling liquid F. However, the heat transfer properties suddenly worsen with respect to the heat transfer at the site of the heated thermocouple HT5. The amount of heat given off by the heating element HE2 can then no longer be transported away to the same extent as before into the surrounding area, and the temperature measured by the heated thermocouple HT5 consequently rises drastically, whereas the temperature measured by the unheated thermocouple UHT5 remains approximately the same. Due to the comparatively slow thermal balance processes (thermal conductivity) taking place in the wall of the housing 12, the temperature rise in the heated thermocouple HT5, however, occurs in a delayed fashion with respect to the dropping of the liquid level. Thus, the gradual increase in the temperature difference between the heated and the unheated thermocouple, here in FIG. 2 an increase of about 100° C., is a reliable indicator for the fill level which has dropped below the height $h_4$.

Similar considerations apply with respect to the levels $h_3$, $h_2$ and $h_1$ and the thermocouples which are respectively assigned thereto.

Since the dropping of the cooling liquid F below the level $h_1$ is considered to be particularly critical, the fill level monitoring with respect to this level is particularly secured: with the two sensor pairs HT1, UHT1 and HT2, UHT2, two mutually independent, redundant measurements are provided. In an alternative embodiment (not shown here), redundancy is provided only with respect to the two heated thermocouples HT1 and HT2, while only a single unheated thermocouple, that is to say either UHT1 or UHT2, is provided as the reference signal transmitter for these two heated thermocouples.

At a higher temperature of the cooling liquid F of, for example, about 330° C., the sudden signal change when the level sinks below the heated thermocouple is not as great, since the effect of local heating by the heating element is not so noticeable due to the ambient temperature which is in any case already comparatively high. This can be seen easily with reference to the temporal profile, shown in FIG. 4, of the differential temperature between the heated and the unheated thermocouple (e.g. HT5 and UHT5). The triggering event, i.e. sinking of the level, was also here assumed to take place at t=100 s. The subsequent temporal change of the temperature difference between the heated and the unheated thermocouple is here, altogether, only around 30° C.

Without a temperature-dependent heating current regulation for the respective heating element, it therefore makes no sense to fix a single, temperature-independent limit value for the sudden signal change, where the sinking of the level is inferred when the limit value is reached or exceeded and a corresponding alarm is triggered. Even in the case of a compensating heating current regulation, it could under certain circumstances take a relatively long time for the thermal balance processes within the measurement tube 6 to be concluded and for such a globally defined limit value to be reached. Moreover, a malfunction of the heating current regulation would be problematic.

In order to avoid such difficulties, a particularly reliable signal evaluation, which reacts quickly to potential danger states, is provided here in the evaluation unit 18, which will be described below with reference to the temporal profile, shown in FIG. 2, of the temperature difference between the heated and the unheated thermocouple at a coolant temperature of about 115° C. and with reference to the associated evaluation table (table I) in FIG. 3.

At regular intervals, here for example every $\delta t=1000$ ms, the temperature measurement values of the heated and the associated unheated thermocouple are temporarily stored. The individual measurement time points . . . , $t_{-2}$, $t_{-1}$, $t_0$, $t_1$, $t_2$, . . . are here entered into column 2 in the table I; the associated temperature measurement values can be found in columns 3 and 4. Likewise every $\delta t=1000$ ms, the temperature differences delta T, or DT for short, between the heated and the associated unheated thermocouple are formed in the evaluation unit 18 and are also temporarily stored like the individual temperatures. The corresponding values are entered in column 5 in the table.

Evaluation occurs in real-time at each of the measurement time points . . . , $t_{-2}$, $t_{-1}$, $t_0$, $t_1$, $t_2$, . . . , wherein the subscripts number the sequence of the measurement time points. The associated sequence of measured differential temperatures is designated . . . , $DT(t_{-2})$, $DT(t_{-1})$, $DT(t_0)$, $DT(t_1)$, $DT(t_2)$, . . . . The instantaneous evaluation time point is designated $t_0$.

For the evaluation, the measurement value of DT at time point $t_0$, that is to say $DT(t_0)$, and its N=50 predecessors $DT(t_{-1})$, . . . , $DT(t_{-N})$ are used, which corresponds to an evaluation interval $\Delta t = t_0 - t_{-N} = 50$ s at the selected step duration of $\delta t = t_0 - t_{-1} = t_{-1} - t_{-2} = \ldots = 1000$ ms=1 s. Here, all the differences $\delta_1 = DT(t_0) - DT(t_{-1})$, . . . , $\delta_N = DT(t_0) - DT(t_{-N})$ between the last ascertained measurement value $DT(t_0)$ and all of its temporarily stored predecessors, which occur within said evaluation interval $\Delta t$—that is to say in this case within the past 50 s—, are formed. These differences $\delta_1$ to $\delta_N$ are in each case entered in the form of a row for each of the measurement time points in the field 6 in the table. An alarm is triggered if one of the differences (delta T changes) ascertained in this manner has reached or exceeded a specific, previously fixed limit value, for example $\Delta DT=5°$ C., 10° C. or 25° C. It is possible in particular here for alarm staggering with a plurality of limit values and in each case different sequence reactions to be provided. At the next measurement time point, the evaluation process repeats itself with accordingly updated values.

As can be seen with reference to the framed values in table I, in the (fictitious) exemplary curve (shown in FIG. 2) for about 115° C. coolant temperature at a limit value which is set to a 5° C. differential temperature change, only 2 s after the fill level drops below the heated thermocouple would an alarm be triggered. If the limit value is set at 10° C., in the example the alarm would be triggered after 3 s, and at 25° C. after 6 s.

Figure 4:
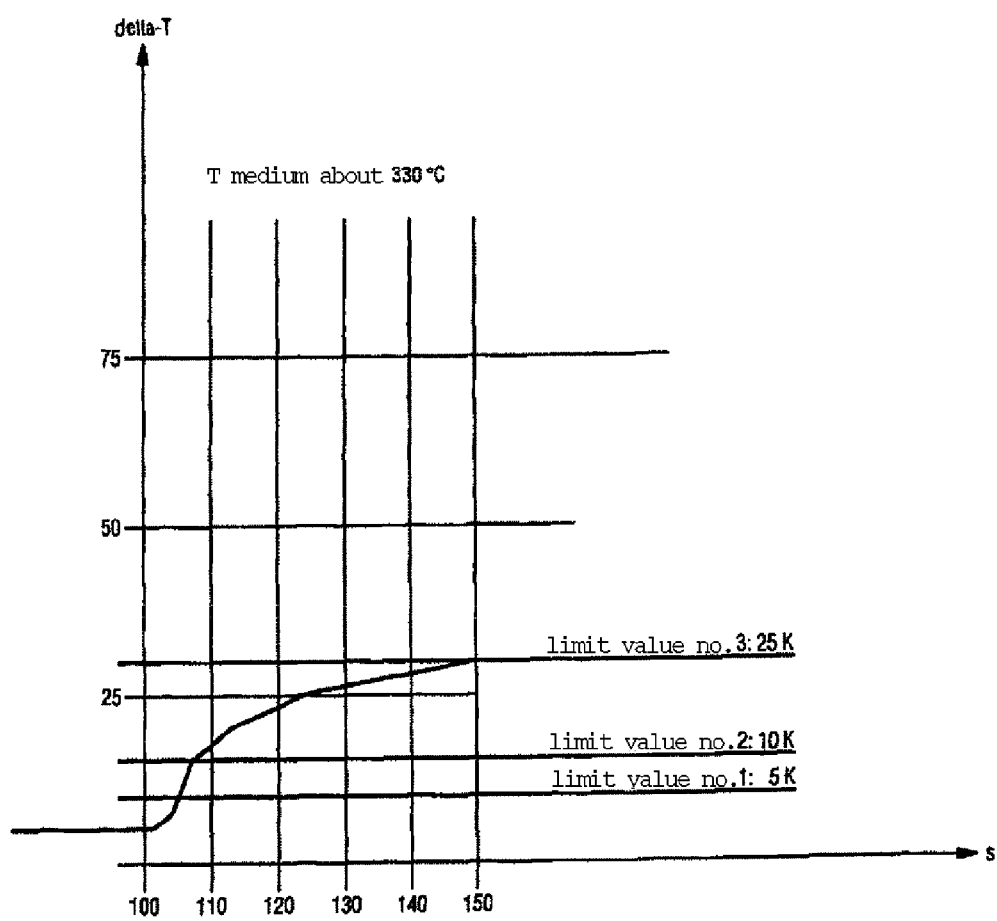
FIG. 4 shows another example of the temporal profile of the temperature difference between a heated and an unheated thermocouple during a dropping process of the liquid level, here at an operating temperature of about 330° C.

The same evaluation process with the same set parameters is shown in table II according to FIG. 5 for the exemplary curve shown in FIG. 4 with a coolant temperature of about 330° C. The alarm thresholds are again set to differential temperature changes of 5° C., 10° C. and 25° C. and are now reached after 4 s, 6 s and 50 s, respectively.

The step duration was fixed here in the example to $\Delta t=1000$ ms for reasons of simplified illustration; in practice, shorter time durations of, for example, $\delta t=250$ ms would be conceivable and expedient for optimized reaction behavior.

The invention claimed is:

1. A method of monitoring a fill level of a liquid in a liquid container, which comprises:
    providing a liquid container with a heated thermocouple mounted in the container at a given installation height level and an associated unheated thermocouple;
    inferring that the liquid level has sunk below the given installation height level of the heated thermocouple from a measured temperature difference between the heated thermocouple and the unheated thermocouple;
    continuously monitoring a temporal profile of the temperature difference for a significant increase within a time interval, which occurs before a respective evaluation time point, of a duration that is previously fixed;
    outputting an alarm signal as soon as a change in the temperature difference within the time interval reaches or exceeds a previously fixed limit value;
    thereby ascertaining a sequence of temperature differences over a large number of periodically sequential measurement time points, wherein the differences between the last ascertained sequence element and all of its predecessors, the measurement time points of which fall within a time interval of pre-specified length, are formed at an evaluation time point, and the alarm signal is output as soon as at least one of the differences reaches or exceeds a previously fixed limit value.

2. The method according to claim 1, which comprises monitoring the temporal profile of the temperature difference for a sudden increase within the time interval before the respective evaluation time point.

3. The method according to claim 1, which comprises monitoring a coolant fill level in a reactor pressure vessel of a pressurized-water reactor plant.

4. The method according to claim 1, which comprises repeating the evaluation process iteratively at each measurement time point.

5. The method according to claim 1, which comprises predetermining a temporal gap between two immediately successive measurement time points to lie in a range between 50 ms and 1000 ms.

6. The method according to claim 5, which comprises setting the temporal time gap in a range between 100 ms and 350 ms.

7. The method according to claim 1, which comprises pre-specifying the length of the time interval to lie in a range between 30 s and 100 s.

8. The method according to claim 7, which comprises pre-specifying the length of the time interval to be approximately 50 s.

9. The method according to claim 1, which comprises temporarily storing the measured temperature differences in a FIFO memory.

10. The method according to claim 1, which comprises pre-specifying a plurality of different limit values, and triggering respectively different alerts when the limit values are reached or exceeded.

11. The method according to claim 1, which comprises deactivating an alarm, once triggered, if, after the alarm has been triggered, the temperature difference has dropped by a pre-specified amount within a pre-specified time interval.

12. The method according to claim 1, which comprises deactivating an alarm, once triggered, if, after the alarm has been triggered, the temperature difference has dropped to, or below, a threshold value that has been pre-specified in a temperature-independent fashion.

13. The method according to claim 1, which comprises measuring one or both of the temperature and the pressure of a medium, which is to be monitored with respect to its fill level height, in the liquid container and wherein an alarm, once triggered, is deactivated if, after the alarm has been triggered, the temperature difference has dropped to, or below, a threshold value which is pre-specified in dependence on one of both of an instantaneous temperature and an instantaneous pressure.

14. An electronic evaluation and control unit for a device for monitoring a fill level of a liquid in a liquid container, comprising:
- a signal input for measurement signals of an associated heated thermocouple and a signal input for an unheated thermocouple associated with the heated thermocouple;
- a subtraction unit configured to form from the measurement signals a temperature difference signal characteristic for a temperature difference with respect to the heated and unheated thermocouples;
- an evaluation unit with means for continuously monitoring a temporal profile of the temperature difference for a significant increase within a time interval of predetermined duration, which time interval occurs before a respective evaluation time point;
- an alarm output for outputting an alarm signal as soon as an increase in the temperature difference within the time interval reaches or exceeds a predetermined limit value;
- said evaluation unit being configured to ascertain a sequence of temperature differences over a large number of periodically sequential measurement time points, wherein the differences between a last ascertained sequence element and all predecessors thereof, the measurement time points of which fall within a time interval of pre-specified length, are formed at an evaluation time point, and to output an alarm signal as soon as at least one of the differences reaches or exceeds a previously fixed limit value.

15. The device according to claim 14, wherein said evaluation unit is configured to monitor the temperature difference for a sudden increase.

16. A device for monitoring a fill level of a liquid in a liquid container, comprising:
- a heated thermocouple mounted in the liquid container and an associated unheated thermocouple in the liquid container; and
- an electronic evaluation and control unit according to claim 14 connected to receive the output signals from the heated thermocouple and the unheated thermocouple.

17. An electronic evaluation and control unit for a device for monitoring a fill level of a liquid in a liquid container, comprising:
- a signal input for a temperature difference signal generated by a circuit with a heated thermocouple and an unheated thermocouple;
- an evaluation unit with means for continuously monitoring a temporal profile of the temperature difference for a significant increase within a time interval of predetermined duration, which time interval occurs before a respective evaluation time point;
- an alarm output for outputting an alarm signal as soon as an increase in the temperature difference within the time interval reaches or exceeds a predetermined limit value;
- said evaluation unit being configured to ascertain a sequence of temperature differences over a large number of periodically sequential measurement time points, wherein the differences between a last ascertained sequence element and all predecessors thereof, the measurement time points of which fall within a time interval of pre-specified length, are formed at an evaluation time point, and to output an alarm signal as soon as at least one of the differences reaches or exceeds a previously fixed limit value.

18. The device according to claim 17, wherein said evaluation unit is configured to monitor the temperature difference for a sudden increase.

19. A device for monitoring a fill level of a liquid in a liquid container, comprising:
- a heated thermocouple mounted in the liquid container and an associated unheated thermocouple in the liquid container; and
- an electronic evaluation and control unit according to claim 17 connected to receive the output signals from the heated thermocouple and the unheated thermocouple.

* * * * *